US000001505H

United States Statutory Invention Registration [19]

[11] Reg. Number: H1505

Oguro

[45] Published: Dec. 5, 1995

[54] STEEL RADIAL TIRE

[75] Inventor: Yoshiyuki Oguro, Tokyo, Japan

[73] Assignee: Tokyo Rope Mfg. Co., Ltd., Tokyo, Japan

[21] Appl. No.: 39,694

[22] Filed: Mar. 31, 1993

Related U.S. Application Data

[63] Continuation-in-part of Ser. No. 809,925, Dec. 18, 1991, abandoned.

[30] Foreign Application Priority Data

Dec. 27, 1990 [JP] Japan ..... 2-405118 ]U

[51] Int. Cl.[6] ..... B60C 9/00; D02G 3/48

[52] U.S. Cl. ..... 152/451; 57/213; 57/230; 57/902; 152/556

[58] Field of Search ..... 57/902, 213, 217, 57/230; 152/451, 556

[56] References Cited

U.S. PATENT DOCUMENTS

| | | | |
|---|---|---|---|
| 3,726,078 | 4/1973 | Nakamura . | |
| 4,158,946 | 6/1979 | Bourgois . | |
| 4,332,131 | 6/1982 | Palsky et al. | 57/902 X |
| 4,707,975 | 11/1987 | Umezawa | 57/902 X |
| 4,783,955 | 11/1988 | Uchio . | |
| 4,974,654 | 12/1990 | Heishi | 57/902 X |

FOREIGN PATENT DOCUMENTS 63-186798 11/1988 Japan .

OTHER PUBLICATIONS

*Mechanics of Pneumatic Tires,* ed. Samuel Clark: US Department of Transportation, Aug. 1981, p. 303.

Practical Manual for Wire Ropes; Oct. 15, 1967; pp. 176–185.

*Primary Examiner*—Donald P. Walsh
*Assistant Examiner*—Chrisman D. Carroll
*Attorney, Agent, or Firm*—Frishauf, Holtz, Goodman & Woodward

[57] ABSTRACT

A steel cord has a core strand and an outer strand. The core strand includes three wire filaments located in a core portion and each having a same diameter, and nine wires located to enclose the three wires, twisted together with the three wire filaments, and each having a diameter smaller than that of each of the three wires. The outer strand has wires located to enclose the nine wires of the core strand, twisted in a direction reverse to the twisting direction of the core strand, and having a clearance between them.

12 Claims, 10 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

STEEL RADIAL TIRE

This application is a continuation-in-part of application Ser. No. 07/809,925, filed Dec. 18, 1991, now abandoned.

BACKGROUND OF THE INVENTION

1. Field of the Invention

The present invention relates to a steel radial tire for large-sized vehicles such as a bus or a truck and, more particularly to a steel radial tire having excellent durability and a steel cord with excellent corrosion resistance and fatigue resistance.

2. Description of the Related Art

The steel radial tire is a combination of material characteristics possessed by steel filaments and rubber. Particularly from the viewpoint of enhancing the product workability and durability of the tire, the rate of steel filaments relative to rubber is determined considering balance between the rigidity of steel filaments and the softness of rubber.

U.S. Pat. No. 3,726,078 discloses the technique of using steel cords for the carcass, belt and breaker of the tire.

U.S. Pat. No. 4,158,946 discloses a steel cord having a three-layer strand structure (3+9+15), as shown in FIG. 1. In the case of the steel cord of this three-layer strand structure, however, the space between the filaments becomes too large and many portions in the steel cord are left not filled with rubber. This makes it liable that the steel filaments are separated from rubber. Namely, the so-called separating phenomenon is liable to be caused.

Japanese Utility Model Disclosure Sho 63-186798 discloses a steel cord having a two-layer strand structure in which steel filaments each having a same diameter are used, as shown in FIGS. 2 and 3. In the case of this two-layer strand structure (12+n), the filling of rubber between the strands can be improved but the amount of rubber filled into the center core is not enough.

The bonding of steel filaments relative to rubber depends upon the surface condition of each of the steel filaments and the condition of rubber filled. When tires of a vehicle are repeatedly compressed, stretched and bent while they are in use (or the vehicle is running) in the case where these steel cords whose core portion is not fully filled with rubber are used for the tires, therefore, three steel filaments in the core portion of each cord are moved in rubber and worn while rubbing against one another. In short, the so-called fretting is caused. When this fretting is caused, the durability of the tires becomes remarkably low.

Particularly in the case of the steel cord disclosed by Japanese Utility Model Disclosure Sho 63-186798, nine steel filaments in the inner strand are closely contacted with one another and this makes it difficult for rubber to penetrate into three steel filaments in the core. When a needle, for example, sticks into the tire and its front end reaches the steel cords in the tire, therefore, water can penetrate into the tire along the needle for a short time and move through those clearances in the steel cord which are not filled with rubber. As the result, the steel cord corrodes.

Further, when the grasping force of steel filaments in the outer and inner strands relative to three steel filaments in the core portion is small, ends of these three steel filaments in the core portion come out of the tire surface, which can cause an accident.

SUMMARY OF THE INVENTION

The object of the present invention is therefore to provide a steel radial tire for large-sized vehicles having excellent durability and a steel cord with excellent corrosion resistance and fatigue resistance.

According to an aspect of the present invention, there is provided a steel radial tire comprising: a tire tread; a tire belt located radially inward of the tire tread; a tire carcass located radially inward of the tire belt, and having a plurality of steel cords embedded in rubber; each of the steel cords comprising three first wires positioned to form a core strand, each of the three first wires having a first diameter; nine second wires respectively having a second diameter smaller than the first diameter of the first wires, positioned to enclose the first wires in the core strand, the second wires being twisted together with the three first wires in the same direction, the first diameter being 5 percent to 15 percent thicker than the second diameter, the second wires having a space S2 therebetween, the space S2 being defined as a shortest distance between a respective outer surface of each of two adjacent second wires, and the space S2 being 10 percent to 25 percent of a sum of a diameter of one of the second wires and the space S2; a plurality of third wires preferably twelve to fourteen positioned to enclose the second wires, the third wires being twisted in a direction opposite to the given twisting direction of the first and second wires; and a space S1 formed between adjacent ones of the third wires.

In this case, the first diameter is preferably 9.5 to 15 percent thicker than the second diameter, and more preferably 10 to 15 percent thicker than the second diameter.

The space S2 is preferably 13 to 25 percent of the sum of the second diameter and the space S2.

The diameter of each of the first wires is in a range of 0.20 mm to 0.24 mm, preferably in a range of 0.21 mm to 0.23 mm.

The diameter of each of the second wires is preferably 0.20±0.01 mm.

The diameter of each of the third wires is preferably 0.22±0.01 mm.

It is also preferable that each of the wire filaments plated with brass so as to enhance the bonding of the wire filaments relative to rubber.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Various embodiments of the present invention will be described referring to the accompanying drawings.

The double twister used to make steel cords will be described at first with reference to FIGS. 4 to 6.

Figure 4:
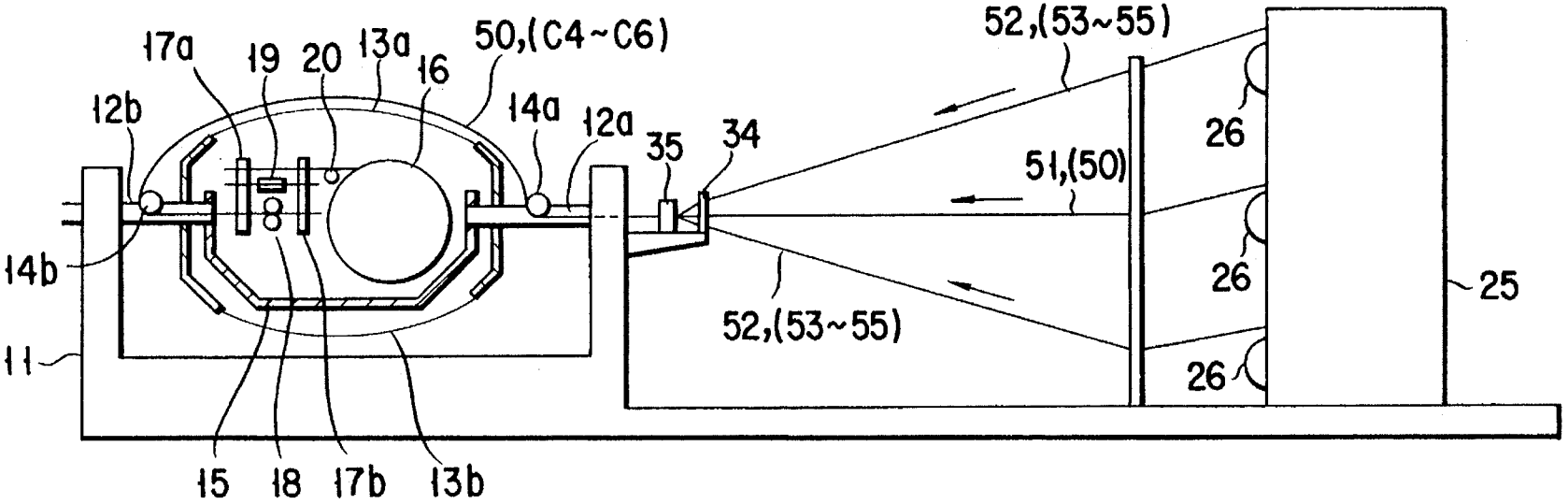
FIG. 4 is a sketch showing the double twister partly cut off.
Figure 5:
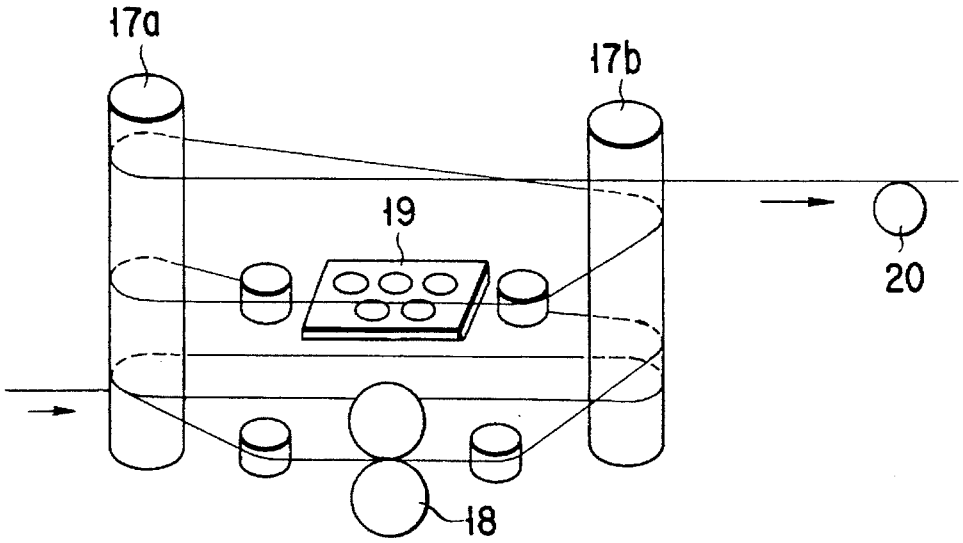
FIG. 5 is a perspective view showing how capstans the overtwister and rolls are positioned in the double twister.

As shown in FIG. 4, the double twister includes first and second turn rolls 14*a* and 14*b* arranged on and rotated round a same axial line. Further, a takeup bobbin 16 is located between the first 14*a* and the second turn roll 14*b*.

The body frame of the double twister is supported rotatable by a frame 11 through a pair of hollow spindles 12*a* and 12*b*. Loops 13*a* and 13*b* are arranged between these paired hollow spindles 12*a* and 12*b*. The first turn roll 14*a* is attached to the one spindle 12*a* while the second turn roll 14*b* to the other spindle 12*b*.

Figure 6:
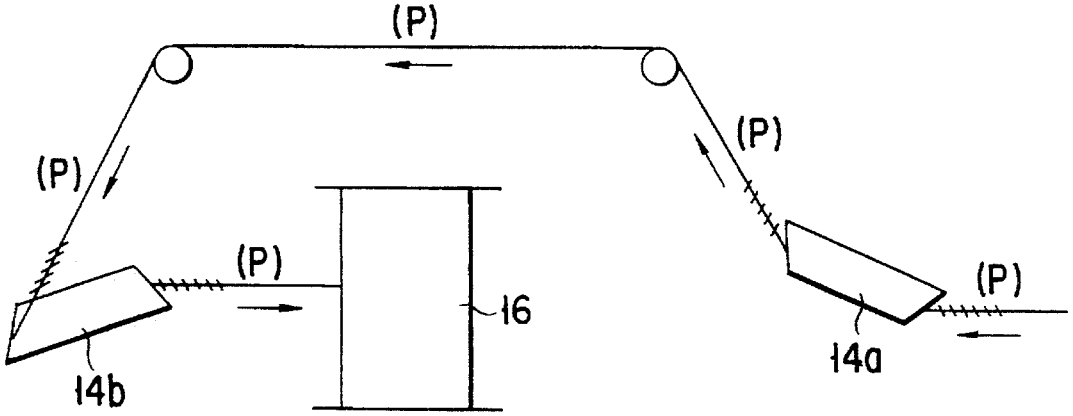
FIG. 6 shows a part of the double twister to explain how the twisting pitch of a strand is adjusted.
Figure 7:
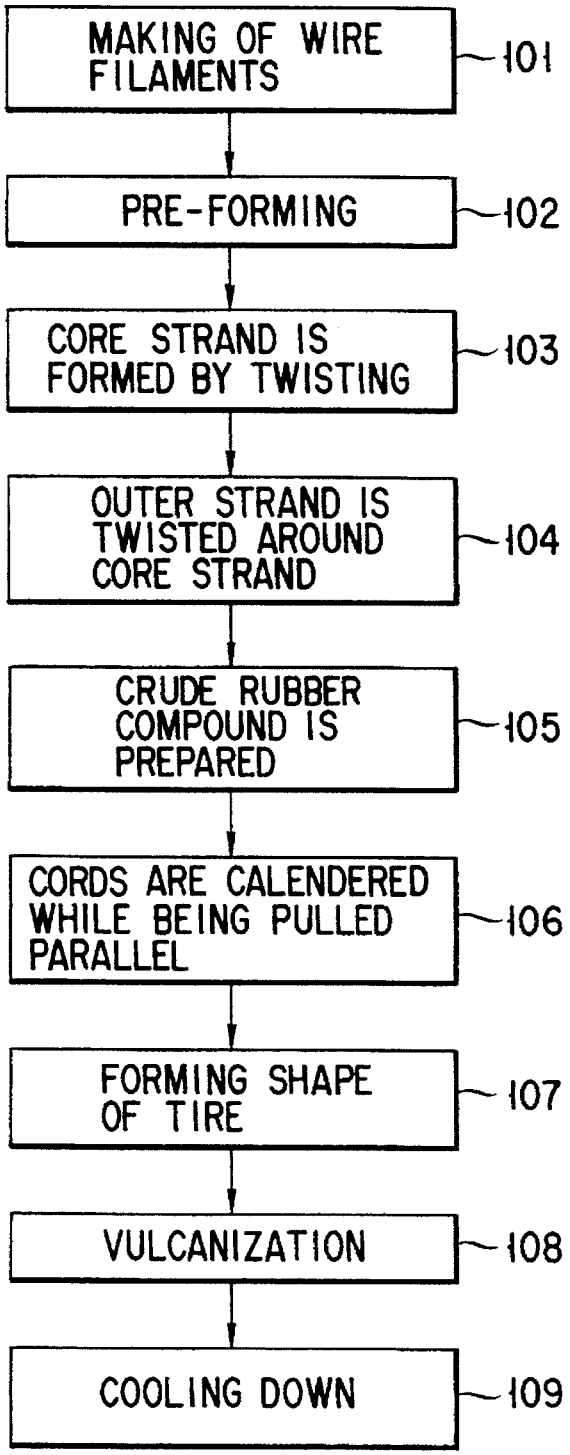
FIG. 7 is a flow chart intended to explain the manner of making a steel cord and the carcass section of a tire in which this steel cord is used.

As shown in FIG. 6, each of the first and second turn rolls 14*a* and 14*b* is shaped like a conical trapezoid having a tapered circumferential face and its center axis round which it is rotated is tilted relative to the vertical axis by a predetermined angle. The takeup roll 16 is kept in a certain pose, independently of the rotation of the turn rolls 14*a* and 14*b*.

As shown in FIG. 4, a cradle 15 is arranged between both opposed ends of the spindles 12*a* and 12*b* and inside the space enclosed by the loops 13*a* and 13*b*. The cradle 15 is supported rotatable by the spindles 12*a* and 12*b* in such a way that it can be kept in a certain pose at all times independently of the rotation of the spindles 12*a* and 12*b*.

The takeup bobbin 16, capstans 17*a*, 17*b*, overtwisters 18, rolls 19 and a traverser 20 are arranged in the cradle 15.

A wire filaments supply section 25 is located upstream the spindles 12*a* and 12*b*. The wire filaments supply section 25 has plural bobbins 26, from which wire filaments or strands are continuously spun toward twisting die (or voice).

The frame 11 is provided with a wire filaments or strands collecting section which comprises a head plate 34 and the twisting die 35. Each of the wire filaments or strands which have passed through the collecting section is introduced into the cradle 15, passing over the first turn roll 14*a*, the loop 13*a* and the second turn roll 14*b*.

A bundle of wire filaments or strands which has been introduced into the cradle 15 is stretched, passing between the capstans 17*a*, 17*b*, the over-twisters 18 and the leveling rolls 19. It is then wound by the takeup bobbin 16 after again passing between the leveling rolls 19, the capstans 17*a*, 17*b* and over the traverser 20.

A case where an example 1 of the steel cord is made will be described referring to FIGS. 7 through 10 and Table 1.

Wire Filament

The bare wire which is defined in (JIS) Japanese Industrial Standard G3506 SWRH72A was stretched. The bare wire thus obtained and having a diameter of 1.0 mm was heat-treated. This bare wire was dipped in a solution of copper pyrophosphate and a solution of zinc sulfate respectively, and treated by the electroplating. The wire was heated to diffuse Cu and Zn on the heated wire. The plated layer was thus brass. It had the plated layer composition of about Cu 63 wt %. It was further stretched to have a diameter of 0.20 mm and 0.21 mm (its tensile strength was in a range of about 280–290 kgf/mm$^2$). Its plating thickness was about 0.2 μm (step 101).

Strand

When the spindles 12*a* and 12*b* are rotated forward, the turn rolls 14*a*, 14*b* and the loops 13*a*, 13*b* rotate round the rotating axis of the spindles 12*a* and 12*b* at a certain speed. Wire filaments 51 and 52 are spun from bobbins 26 and passed through the head plate 34 and the twisting die 35 to form a bundle 50 of wire filaments. Each of the wire filaments 51 and 52 is so preformed as to be easily twisted (step 102).

Inner wire filaments 51 spun from three bobbins 26 and outer ones 52 spun from nine bobbins 26 are adjusted to have an optimum length balance and their tension balance is also controlled.

While being wound round the capstans 17*a* and 17*b*, the wire bundle 50 enters into the spindle 12*a*. It is then double-twisted while passing over the first turn roll 14*a*, the one loop 13*a* and the second turn roll 14*b* (step 103). More specifically, the wire bundle 50 advances rotating along the tapered roll face of the first turn roll 14*a* in a small-diameter portion thereof. In short, it is twisted on its entering side of the first turn roll 14*a* but untwisted on its departing side thereof. It is thus twisted in a direction reverse to its advancing direction. When it is assumed that the final twisting pitch of a steel cord to be made is represented by a pitch length P, the wire bundle 50 is twisted a first time while passing over the first turn roll 14*a*, and its pitch length becomes 2P. It is then treated in the same manner as described above at the section of the second turn roll 14*b*. It is thus twisted in the direction reverse to its advancing direction. It is therefore twisted a second time while passing over the second turn roll 14*b*, and its pitch length becomes P.

After passing over the second turn roll 14*b*, the wire bundle 50 enters between the over-twisters 18 through the capstans 17*a* and 17*b*. The rotation of the wire bundle 50 is controlled by the over-twisters 18.

The wire bundle 50 then reaches the leveling rolls 19 and it is made straight by them and then wound by the takeup bobbin 16 (step 103).

Figure 8:
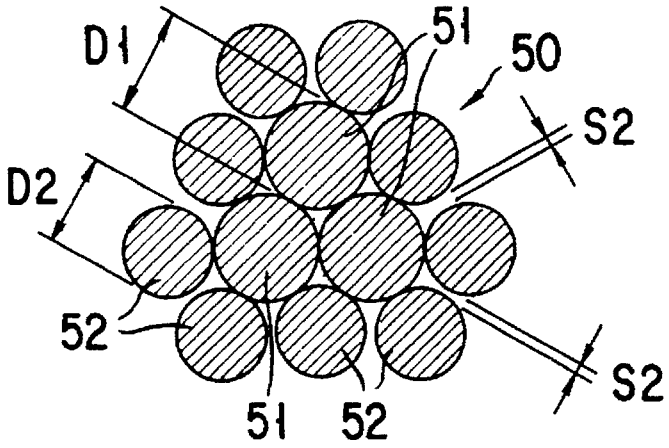
FIG. 8 is a cross-sectional view showing the core strand according to an embodiment of the present invention.
Figure 9:
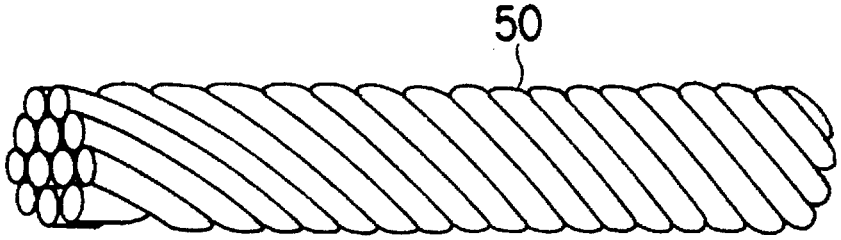
FIG. 9 is a perspective view showing the core strand.

As shown in FIGS. 8 and 9, the wire bundle 50 finally becomes a strand having a predetermined twisting pitch of {(3×0.21)/(9×0.20)}. The core strand 50 having the above-described structure can be applied, as is described in U.S. Pat. No. 4,783,955, to the belt section of a tire for use with small- or medium-sized vehicles.

Figure 10:
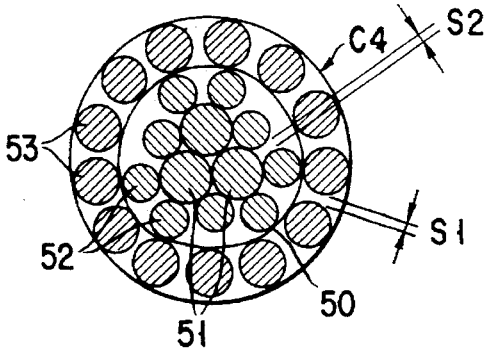
FIGS. 10 through 13 are cross-sectional views showing steel cords according to the present invention, respectively.

Using a tubular type strander (not shown), plural wire filaments are then spiral-twisted round the core strand 50 at a predetermined pitch and in a direction reverse to the twisting direction of the core strand 50 (step 104). A cord C4 having a twisting pitch of {(3×0.21)/(9×0.20)+(13×0.22)} is thus finally made, as shown in FIG. 10 and Table 1.

Steel Radial Tire

Crude rubber, carbon black, sulfur, vulcanization accelerator and other tempering agents are mixed to prepare a crude rubber compound having predetermined composition (step 105).

Steel cords are pulled out from hundred reels suspended by a creel stand and they are coated with the upper rubber compound and lower rubber compound while passing parallel to one another between calender rolls. They are then wound like a sheet. This is called calendering (step 106).

This calender sheet is cut at a certain length and these sheets thus cut to have a same length are jointed with one another to form a single strip.

The jointed single strip is combined with other tire members and formed as a tire by a tire forming machine. This is called green tire (step 107).

The green tire is vulcanized at a temperature of about 150° C. while adding pressure to it in a mold (step 108).

After being vulcanized for a certain time period, the tire is taken out of the mold and cooled (step 109). The crude rubber compound is liquidized by the vulcanization and it enters into the inner strand of the cord C4, passing through clearances $S_1$ between wire filaments 53 in the outer strand. Further, the flowed rubber compound contacts wire filaments 51 in the inner strand, passing through clearances $S_2$ between wire filaments 52 in the inner strand shown in FIG. 8 and FIG. 10.

When the flowed rubber compound contacts the plating on each of the wire filaments 51, 52 and 53, sulfur in the compound reacts with Cu in the plating to form strong chemical coupled layer. The vulcanized tire is taken out of the mold and cooled (step 109). Each of the wire filaments 51, 52 and 53 is firmly bonded to rubber.

Figure 11:
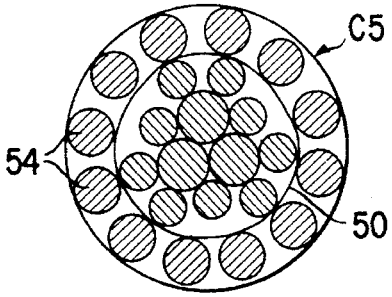
Figure 12:
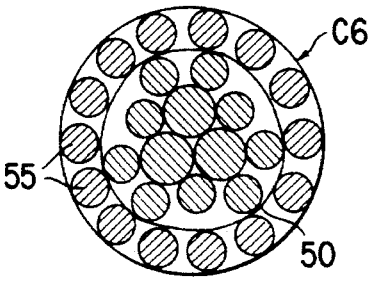
Figure 13:
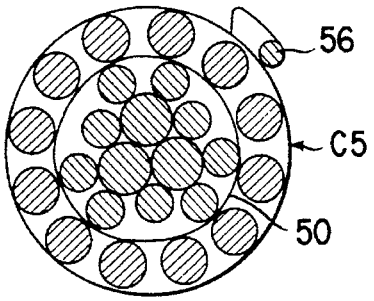

Other steel cords C5 and C6 shown in FIGS. 11 through 13 were made according to the substantially same manner as in the case of the steel cord C4.

Table 1 shows structures of various steel cords thus obtained.

1 through 6 and 1 through 3 in Table 1 correspond to the following steel cords. "Twisting pitch 12/18" in Table 1 means that the twisting pitch of the core strand 50 is 12 mm and that the twisting pitch of the outer strand is 18 mm. "Twisting direction S/Z" in Table 1 means that the twisting of the core strand 50 is reverse to that of the outer strand. The diameter of inner wire filament in core strand in Table 1 means the increase in size of the diameter $D_1$ of each of three wire filaments 51 relative to the diameter $D_2$ of each of nine wire filaments 52 in the core strand 50. In short, it means a value obtained by formula $(D_1-D_2)/D_2\times100$. "Clearance of wire filaments in outer strand" means the sum of clearances $S_1$ between wire filaments 53 in the outer strand which are present between two inner and outer concentric circles occupies the area present between these two concentric circles.

Examples 1 to 3 correspond to the steel cord C4 shown in FIG. 10.

Example 4 corresponds to the steel cord C5 shown in FIG. 11. The outer strand of the steel cord C5 comprises twelve wire filaments 54.

Example 5 corresponds to the steel cord C6 shown in FIG. 12. The outer strand of the steel cord C6 comprises fourteen wire filaments 55.

Example 6 comprises wrapping a wrapping wire filament 56 round the steel cord C5 in a spiral, as shown in FIG. 13.

Figure 1:
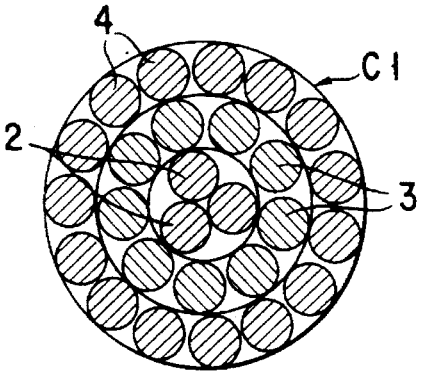
FIG. 1 PRIOR ART
FIGS. 1 through 3 are cross-sectional views showing conventional steel cords, respectively.

Control 1 corresponds to the steel cord C1 shown in FIG. 1.

Figure 2:
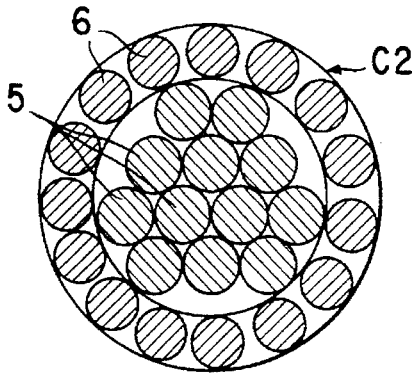
FIG. 2 PRIOR ART

Control 2 corresponds to the steel cord C2 shown in FIG. 2.

Figure 3:
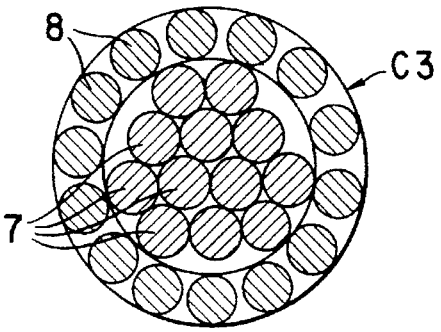
FIG. 3 PRIOR ART

Control 3 corresponds to the steel cord C3 shown in FIG. 3.

Durability and air leak tests conducted about the above-mentioned various steel cords will be described referring to FIGS. 14, 15 and Table 2.

Durability Test

Figure 14:
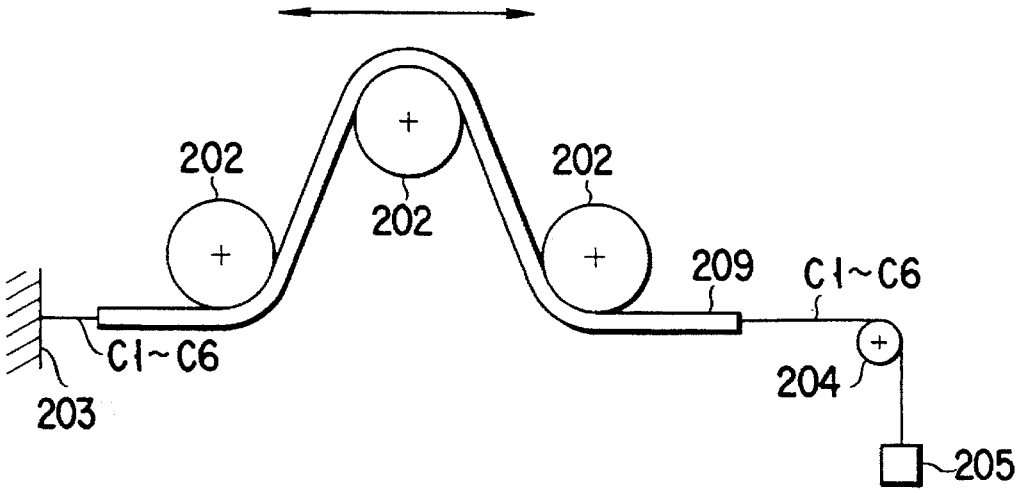
FIG. 14 schematically shows the durability testing device.

FIG. 14 is a sketch schematically showing the fatigue tester. Each of steel cords C1–C6 was embedded in an elongated rubber compound 209 and vulcanized to prepare samples. Tensile and compressive bending stress were added to the sample cords by three rolls 202 under the condition that one end of each of the sample cords was fixed to a fixing member 203 and that the other thereof was connected to a balance weight 205. Each of the rolls 202 had a diameter of 1 inch and three of them were horizontally reciprocated at the same time. The weight of the balance weight 205 was 10% of cord fracture load.

As shown in Table 2, test results of examples 1–6 were better than or same as those of controls 1–3. Durability index in Table 2 denotes the rate of roll reciprocations conducted until each of the other sample cords is broken, relative to those conducted until the sample cord C1 of the control 1 is broken, when the roil reciprocations in the case of the sample cord C1 are 100.

Air Leak Test

Figure 15:
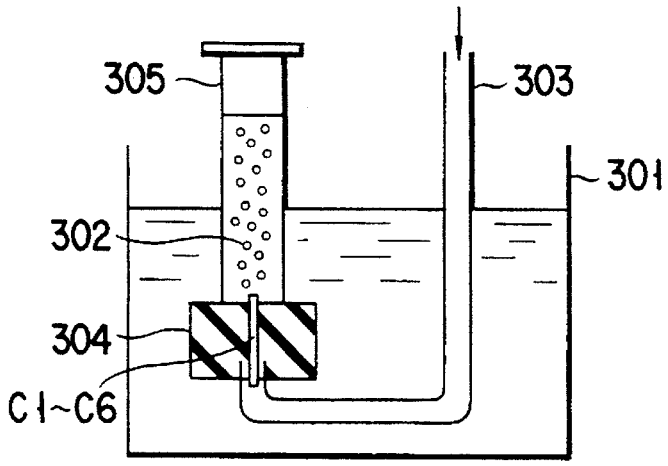
FIG. 15 schematically shows the device for measuring the amount of air penetrated through sample cords.

FIG. 15 is a sketch showing the tester for measuring the leakage of air leaked out along each of the steel cords C1–C6. Each of the steel cords C1–C6 was embedded in a rubber compound and vulcanized to prepare a sample a rubber block 304. The length of that portion of each sample cord which was embedded in the rubber block 304 was 14 mm and both ends of each sample cord were projected from the rubber block 304. A pipe 303 was connected to the lower end of each sample cord and a measuring cylinder 305 was capped round the upper end of each sample cord. Compressed air was supplied to the pipe 303. Each of these samples was sunk in a water of a vessel 301 and air compressed by a pressure of 0.5 kg/mm$^2$ was supplied to the lower end of each sample cord for one minute and the amount of leaked air 302 was measured.

As shown in Table 2, test results of examples 1–6 were better than or same as those of controls 1–3. Air leak index in Table 2 represents the rate of the amount of air leaked along each cord sample relative to that of air leaked along the sample cord C1 of control 1 when the amount of air leaked in the case of the sample cord C1 is 100.

According to the steel cords C4–C6 of examples, the adjacent small wire filaments 52 in the core strand are separated from each other by the clearance $S_2$. This enables rubber to better penetrate to the wire filaments 51 in the core strand when rubber is vulcanized. Even when a needle and the like stick into the tire, therefore, water can be prevented from entering inside the tire cords, so that any of the tire cords cannot be corroded all over it. This enables the durability of the tire to be remarkably increased.

Further, the adjacent wire filaments 52 in the core strand are not closely contacted with each other but separated from each other. Even when tensile, bending and compressing forces are repeatedly added to the cord, therefore, the wire filaments can be kept not rubbed with one another. The fretting wear of the wire filaments can be thus prevented to thereby remarkably enhance the fatigue resistance of the cord.

Furthermore, the wire filaments 52 in the core strand are not closely contacted with one another, their grasping force relative to the wire filaments 51 in the center core is increased and they are firmly held by rubber penetrated. This enables the wire filaments 51 in the core strand to be prevented from shifting from one another.

Still further, rubber is allowed to fully enter between the small wire filaments in the core strand. The bonding of rubber relative to the wire filaments in the core strand can be thus increased to thereby effectively prevent the wire filaments from being shifted from their certain position.

Figure 16:
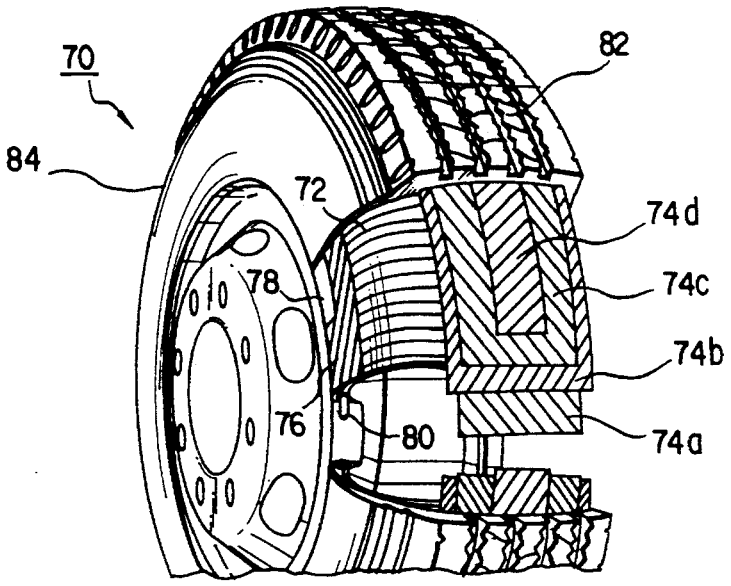
FIG. 16 is a partially cutaway cross-sectional perspective view of the steel radial tire.
Figure 17:
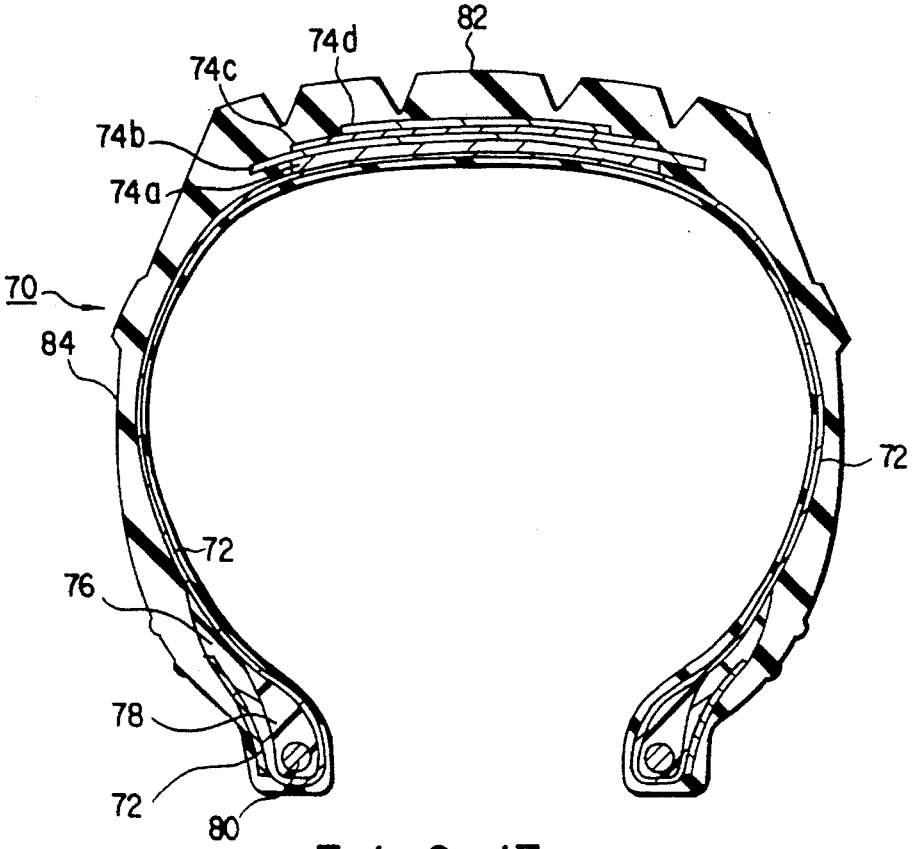
FIG. 17 is a transverse sectional view of the steel radial tire.
Figure 18:
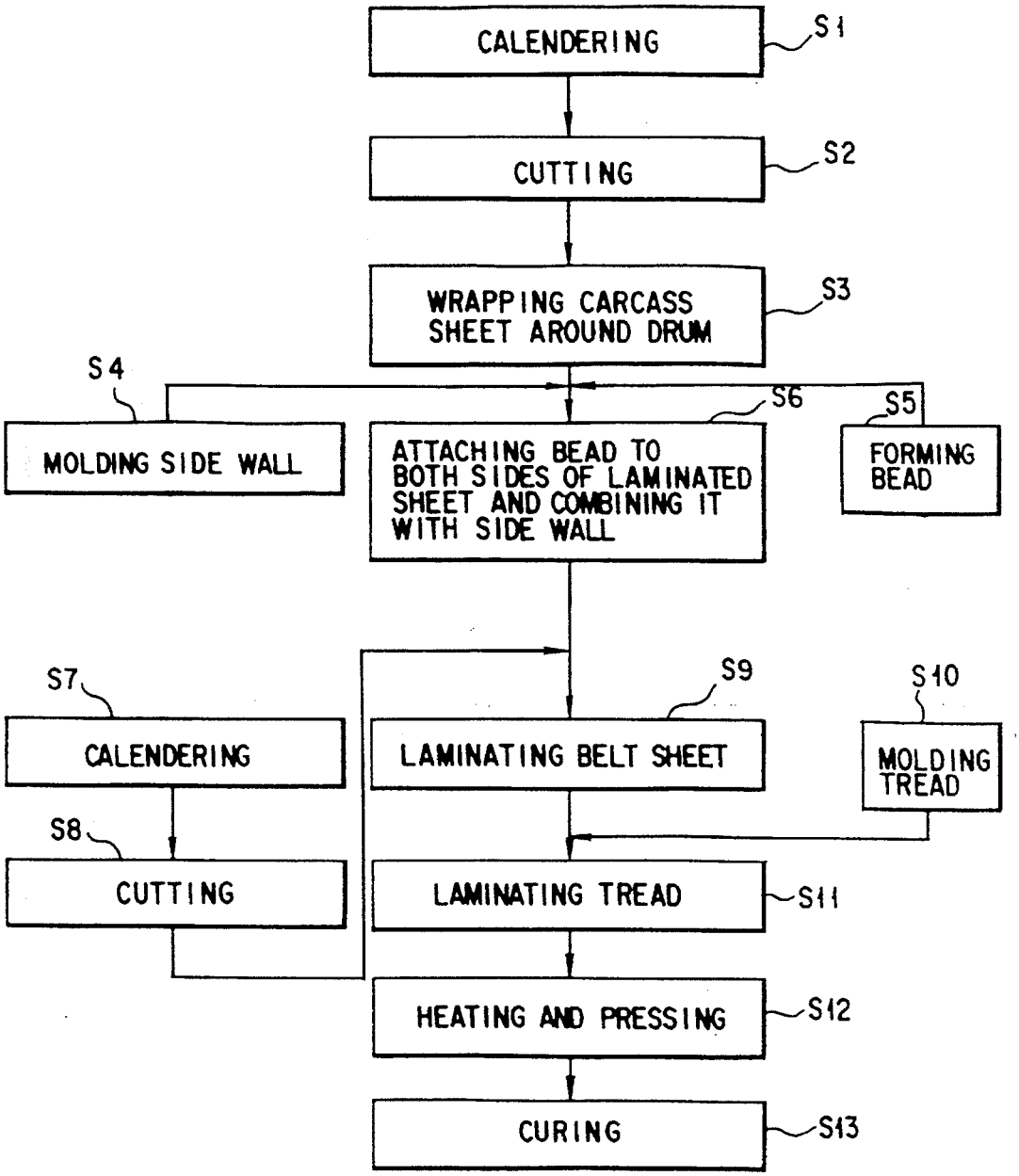
FIG. 18 is a flow chart showing a manufacturing method of the steel radial tire.

The following will explain a case in which the steel cord is used in the tire carcass of the steel radial tire for a truck with reference to FIGS. 16 and 17.

As shown in FIG. 16, the outermost shape of the steel radial tire 70 is covered with a tread 82 and a side wall 84. A concave and convex pattern is formed in a ground surface of the tread 82. An outer peripheral portion of the side wall 84 is continuous to the tread 82. An inner peripheral portion of the side wall 84 is positioned in the vicinity of a bead 80. A side portion including the side wall 84 is an important member, which determines durability of the tire 70 since the side wall 84 is a portion where repeated flexing loads are applied and large deformations are repeatedly generated. Then, a carcass 72 receives most of a heavy load applied to the side portion of the tire 70.

As shown in FIG. 17, the carcass 72 is formed over the tread 82 and the entire surface of the inner surface of the side wall 84. Both ends of the carcass 72 are lapped around the pair of beads 80, respectively. The beads 80 are ring wires having ridigity. In other words, the beads 80 are strengthening members which provide ridigity to the tire together with the rim and carcass 72. Moreover, a side ply 76 and a bead filler 78 are formed just outside of the beads 80. The side ply 76 is made of a rubber plate such that the rigidity of the peripheral portion of the bead 80 is improved. The side ply 76 is formed by reinforcing the rubber plate with a steel cord, such that the rigidity of the side wall 84 is improved.

Figure 21:
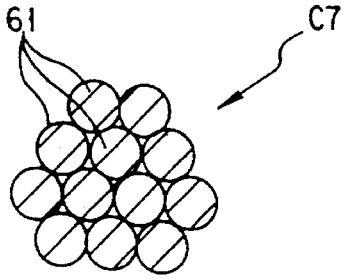
FIGS. 21 and 22 are transverse sectional views showing a steel cord used in the tire belt sheets 74*a*–74*d* respectively.
Figure 22:
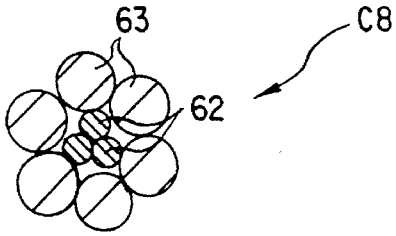

Four belts 74*a* to 74*d* are provided between the carcass 72 and the tread 82. The belts 74*a* to 74*d* are formed by reinforcing a rubber plate 75 with a steel cord C7 (cord of (12×0.25) shown in FIG. 21) or a steel cord C8 (cord of (3×0.20+6×0.25) shown in FIG. 22). The steel cords C7 and C8 are embedded in the rubber to be inclined to the ground surface of the tread 82. The belts 74*a* to 74*d* are overlapped on each other such that the directions of the steel cords C7 and C8 are alternately set. The widths of the belts 74*a* to 74*d* are different from each other.

The carcass 72 is made by reinforcing a rubber plate 73 with a steel cord C4 (cord of (3×0.23/9×0.20+13×0.22) shown in FIG. 10) or a steel cord C5 (cord of (3×0.22/9×0.20+12×0.22) shown in FIG. 11). It is noted that the steel cord C4 or C5 having only the first and second wires without the third wire may be used as a reinforcing cord of the side ply 76.

A method for manufacturing a steel radial tire will be explained with reference to FIGS. 18 to 22.

Figure 19:
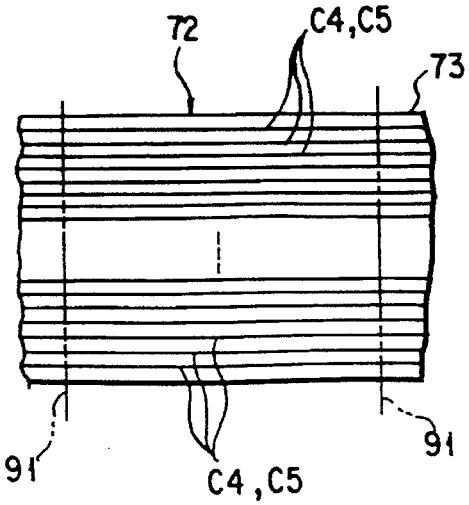
FIG. 19 is a plane view showing a tire carcass sheet before cutting.

As shown in FIG. 19, the steel cords C4 (or C5) are arranged so as to be substantially straight and to have an equal space, and the two plates 73 are laminated to sandwich the cords C4. A carcass plate is manufactured by this calendering (step S1). The carcass plate is cut at predetermined lengths along a cutting line 91 (step S2). The cutting line 91 is orthogonal to the steel cord C4. The carcass sheet 72 is formed by jointing un-cut end portions of the cutting sheet to each other. Then, the carcass sheet 72 is lapped around a drum (not shown) of the tire forming machine (not shown) (step S3).

The side wall 84 is molded to be integral with the side ply 76 and the bead filler 78 (step S4). On the other hand, the steel wire is formed to be ring-shaped, thereby forming the bead 80 (step S5).

The side wall 84 is lapped around the drum, and combined with the carcass 72. Then, a tire assembly is cut from the drum, and set to the drum (not shown) of the tire forming machine. The bead 80 is inserted into both ends of the tire assembly, and both ends of the carcass 72 are lapped around the bead 80 (step S6). Then, pressure air is supplied into the tire assembly such that the tire assembly is expanded.

Figure 20:
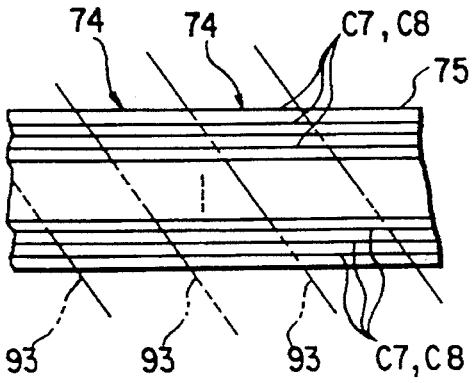
FIG. 20 is a plane view showing a tire belt sheet before cutting.

As shown in FIG. 20, the steel cords C7 (or C8) are arranged so as to be substantially straight and to have an equal space, and the two rubber plates 75 are laminated to sandwich the cords C7. A belt plate is manufactured by such a calendering (step S7). The belt plate is cut to various sizes along a cutting line 93 (step S8). The cutting line 93 is inclined to the steel cords C7. The obtained cut sheets are used as belts 74*a* to 74*d*. The belts 74*a* to 74*d* are sequentially laminated on the carcass 72 of the tire assembly 72 (step S9).

Synthetic rubber is extruded from a tread extruding machine, and the extruded rubber is cooled and cut to a predetermined length, thereby the tread 82 is manufactured (step S10). The tread 82 is laminated to the outer peripheral surface of the tire assembly (step S11). The tire assembly is pressurized, expanded, and heated, thereby a green tire having a predetermined shape is manufactured (step S12). The green time is cured by a curing machine (not shown), and raw rubber is hardened (step S13). Then, a final finishing and an examination are performed, and the steel radial tire 70 is completed.

According to the steel radial tire 70 of the above embodiment, since the steel cords C4 and C5 of the carcass 72 are strong and are not easily rusted, the steel radial tire 70 is excellent in durability as compared with the prior art. Particularly, since rubber is fully packed in the core portion of each of the steel cords C4 and C5, no fretting occurs. Moreover, the first wires will not be pulled out while the tire is running.

Since sufficient strength can be obtained by a small number of steel cords C4 and C5, calendering can be efficiently performed, and productivity can be improved. Therefore, the following shows the number of cords necessary for obtaining a tire carcass having the same strength as the tire carcass in one hundred steel cords C1 ((3+9+15)× 0.22)) of the comparison are arranged by use of the steel cords having the other structure. In this case, the steel cords C1 of the comparison are arranged in parallel on the calendar sheet with a space of 1.9 to 2.3 mm.

In the case of using the steel cords C4 of the above embodiment, the necessary number of the cords is one hundred and nine. In the case of using the steel cords C5, the necessary number of the cords is one hundred and fifteen. In the case of using the steel cords (3×0.22/9×0.20) described in U.S. Pat. No. 4,783,955 (Uchio), 257 steel cords are required since their strength is low.

In short, the present invention can have the following merits.

The wire filaments in the core strand are separated from one another by an appropriate interval and clearance is provided even between the adjacent wire filaments in the outer strand. Therefore, rubber is allowed to better penetrate into the core strand of the cord, passing through the wire filaments in the outer and inner strands, and rubber and the wire filaments can be thus more strongly bonded even in the core strand of the cord. This enables the steel cord of the present invention to be made more excellent in durability. Particularly when these steel cords are used to reinforce the carcasses of tires for use with large-sized vehicles, they can be more stably used for a far longer time.

TABLE 1

| | Sample Cord No. | Structure of metal cord | Twisting pitch | Twisting direction | Diameter-increasing rate of inner wire filament in core strand (%) | Clearance rate of wire filaments in outer strand (%) |
|---|---|---|---|---|---|---|
| Example 1 | C4 | 3 × 0.21/9 × 0.20 + 13 × 0.22 | 12/18 | S/Z | 5 | 12.1 |
| Example 2 | C4 | 3 × 0.22/9 × 0.20 + 13 × 0.22 | 12/18 | S/Z | 10 | 14.0 |
| Example 3 | C4 | 3 × 0.23/9 × 0.20 + 13 × 0.22 | 12/18 | S/Z | 15 | 15.3 |
| Example 4 | C5 | 3 × 0.22/9 × 0.20 + 12 × 0.22 | 12/18 | S/Z | 10 | 20.3 |
| Example 5 | C6 | 3 × 0.22/9 × 0.20 + 14 × 0.20 | 12/8/5 | S/Z | 10 | 12.9 |
| Example 6 | C5 | 3 × 0.22/9 × 0.20 + 12 × 0.22 + 1 × 0.15 | 12/18 | S/Z/S | 10 | 20.3 |
| Control 1 | C1 | 3 + 9 + 15 × 0.22 | 6/12/18 | S/S/Z | — | 6.7 |
| Control 2 | C2 | 1 × 12 + 15 × 0.22 | 12/18 | S/Z | 0 | 11.0 |
| Control 3 | C3 | 1 × 12 + 14 × 0.22 | 12/18 | S/Z | 0 | 16.7 |

TABLE 2

| | Sample Cord No. | Durability Index (%) | Air Leak Index. (%) |
|---|---|---|---|
| Example 1 | C4 | 110 | 63 |
| Example 2 | C4 | 110 | 60 |
| Example 3 | C4 | 124 | 54 |
| Example 4 | C5 | 130 | 49 |
| Example 5 | C6 | 108 | 77 |
| Example 6 | C5 | 113 | 44 |
| Control 1 | C1 | 100 | 100 |
| Control 2 | C2 | 105 | 86 |
| Control 3 | C3 | 112 | 61 |

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A steel radial tire comprising:

a tire tread;

a tire belt located in a radially inward direction of the tire tread;

a tire carcass located in a radially inward direction of the tire belt, and having a plurality of steel cords embedded in a quantity of rubber;

each of the steel cords comprising three first wires positioned to form a core strand, each of the three first wires having a first diameter;

nine second wires, respectively having a second diameter smaller than said first diameter of said first wires, positioned to enclose said first wires in said core strand, the second wires being twisted together with the three first wires in a same direction, said first diameter being 5 percent to 15 percent greater than the second diameter, the second wires having a space S2 therebetween, the space S2 being defined as a space having a shortest distance between a respective outer surface of each of two adjacent second wires, and the space S2 being 10 percent to 25 percent of a sum of a diameter of one of the second wires and the space S2;

a plurality of third wires positioned to enclose the second wires, the third wires being twisted in a direction opposite to the same twisting direction of the first and second wires; and a space S1 between adjacent ones of the third wires, said quantity of rubber sufficiently entering the spaces S1 and S2 to achieve a strong bonding between the three first wires and the nine second wires such that the three first wires will not be pulled out while the tire is running.

2. The radial tire of claim 1, wherein the first wires have first diameters which are 9.5 to 15 percent greater than the second diameters of the second wires.

3. The radial tire of claim 2, wherein the first wires have first diameters which are 10 to 15 percent greater than the second diameters of the second wires.

4. The radial tire of claim 1, wherein the space S2 is 13 to 25 percent of the sum of said second diameter of the second wires and said space S2.

5. The radial tire of claim 1, wherein the first and second wires are twisted to have a same pitch.

6. The radial tire of claim 1, wherein the first diameter of each of the first wires in the core strand is in a range of 0.21 mm to 0.24 mm.

7. The radial tire of claim 1, wherein the second diameter of each of the second wires is 0.20+0.01 mm.

8. The radial tire of claim 1, wherein a diameter of each of the plurality of third wires is 0.22±0.01 mm.

9. The radial tire of claim 1, wherein the number of third wires is in a range of twelve to fourteen.

10. The radial tire of claim 1, wherein each of the first, second and third wires is plated with brass.

11. The radial tire of claim 1, further comprising a wrapping wire spirally wound about said plurality of third wires.

12. The radial tire of claim 6, wherein the first diameter of each of the first wires in the core strand is in a range of 0.21 mm to 0.23 mm.

* * * * *